(12) United States Patent
Wang et al.

(10) Patent No.: US 10,438,575 B2
(45) Date of Patent: Oct. 8, 2019

(54) MULTILAYER FILM, INTERLAYER FILM COMPRISING THE MULTILAYER FILM AND LAMINATED GLASS AND SOUND-INSULATING GLASS LAMINATE COMPRISING THE INTERLAYER FILM

(71) Applicant: CHANG CHUN PETROCHEMICAL CO., LTD., Taipei (TW)

(72) Inventors: Cheng-Fan Wang, Taipei (TW); Chin-Yen Chang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/176,670

(22) Filed: Oct. 31, 2018

(65) Prior Publication Data

US 2019/0156811 A1    May 23, 2019

Related U.S. Application Data

(60) Provisional application No. 62/588,791, filed on Nov. 20, 2017.

(51) Int. Cl.
```
G10K 11/168      (2006.01)
B32B 17/10       (2006.01)
B60J 1/00        (2006.01)
```
(52) U.S. Cl.
CPC ...... *G10K 11/168* (2013.01); *B32B 17/10036* (2013.01); *B32B 17/10165* (2013.01);
(Continued)

(58) Field of Classification Search
CPC ............ G10K 11/168; B32B 17/10036; B32B 17/10165; B32B 17/10761; B32B 2307/102; B32B 2605/006; B60J 1/001
(Continued)

(56) References Cited

U.S. PATENT DOCUMENTS

| 5,190,826 A | 3/1993 | Asahina et al. |
| 7,721,844 B1 * | 5/2010 | Lewis ................. F16F 15/0232 |
| | | 181/207 |

(Continued)

FOREIGN PATENT DOCUMENTS

| JP | 5064606 B2 | 10/2012 |
| JP | 5132709 B2 | 1/2013 |

(Continued)

OTHER PUBLICATIONS

Robert F. Fedors, entitled, "A Method for Estimating Both the Solubility Parameters and Molar volumes of Liquids", Polymer Engineering and Science, Feb. 1974, vol. 14, No. 2, pp. 147-154.

(Continued)

*Primary Examiner* — Forrest M Phillips
(74) *Attorney, Agent, or Firm* — Nixon Peabody LLP; Thomas P. Pavelko

(57) ABSTRACT

The present invention relates to a multilayer film. In various embodiments the multilayer film is an interlayer film for laminated glass. The present invention also relates to an interlayer film for laminated glass, wherein the laminated glass has excellent sound insulating properties. The present invention also relates to a laminated glass that is obtained using this interlayer film. The present invention can effectively improve the compatibility of the resin film (B) with the plasticizer so that the intermediate layer (i.e., the resin film (B)) allows to add more plasticizer(s) to achieve the effect of enhancing sound-insulating. Furthermore, the intermediate layer of the multilayer film uses different plasticizer from the non-intermediate layer of the multilayer film so as to prevent the migration of plasticizers between different layers and the multilayer film has little or no plasticizer bleed-out.

21 Claims, 2 Drawing Sheets

(52) U.S. Cl.
CPC .. *B32B 17/10761* (2013.01); *B32B 2307/102* (2013.01); *B32B 2605/006* (2013.01); *B60J 1/001* (2013.01)

(58) Field of Classification Search
USPC .......................................................... 181/290
See application file for complete search history.

(56) References Cited

U.S. PATENT DOCUMENTS

| | | | |
|---|---|---|---|
| 8,551,621 | B2 | 10/2013 | Matsuda et al. |
| 8,784,992 | B2 | 7/2014 | Fukatani et al. |
| 8,828,549 | B2 | 9/2014 | Matsuda et al. |
| 2008/0163977 | A1 | 7/2008 | Keller |
| 2010/0101891 | A1* | 4/2010 | Kamikawa ............. B32B 15/14 181/290 |
| 2011/0125114 | A1* | 5/2011 | Bekele .................... A61F 5/445 604/332 |
| 2012/0088082 | A1 | 4/2012 | Friedman et al. |
| 2013/0189528 | A1 | 7/2013 | Matsuda et al. |
| 2016/0214354 | A1 | 7/2016 | Yoshida et al. |
| 2016/0214355 | A1 | 7/2016 | Mikayama et al. |
| 2016/0243797 | A1 | 8/2016 | Iwamoto et al. |
| 2016/0279905 | A1 | 9/2016 | Iwamoto et al. |
| 2016/0288465 | A1 | 10/2016 | Nakayama et al. |
| 2016/0311199 | A1 | 10/2016 | Iwamoto et al. |
| 2016/0332424 | A1 | 11/2016 | Yamaguchi et al. |
| 2016/0332425 | A1 | 11/2016 | Yamaguchi et al. |
| 2016/0347035 | A1 | 12/2016 | Komatsu et al. |
| 2016/0375659 | A1* | 12/2016 | Payen ............... B32B 17/10036 181/290 |
| 2016/0376413 | A1* | 12/2016 | Sasaki .................. C08J 5/18 428/426 |
| 2019/0047262 | A1* | 2/2019 | Minakuchi ............. B32B 27/30 |
| 2019/0069351 | A1* | 2/2019 | Nakajima ................ B32B 7/02 |

FOREIGN PATENT DOCUMENTS

| | | |
|---|---|---|
| JP | 5208605 B2 | 6/2013 |
| JP | 5317696 B2 | 10/2013 |
| JP | 5336846 B2 | 11/2013 |
| JP | 5629393 B2 | 11/2014 |
| JP | 5793261 B1 | 10/2015 |
| JP | 2016011251 A | 1/2016 |

OTHER PUBLICATIONS

Technical Bulletin, Saflex Q Series Head-Up-Display (HUD) Interlayer Technology, 4 pages.
Technical Bulletin, Aldrich, Reference Polymer Properties, pp. 46-49.

* cited by examiner

MULTILAYER FILM, INTERLAYER FILM COMPRISING THE MULTILAYER FILM AND LAMINATED GLASS AND SOUND-INSULATING GLASS LAMINATE COMPRISING THE INTERLAYER FILM

CROSS-REFERENCE TO RELATED APPLICATION

This application claims the benefit under 35 U.S.C § 119(e) of U.S. Provisional Patent Application No. 62/588,791 filed on Nov. 20, 2017, which is incorporated herein by reference in its entirety.

FIELD OF THE INVENTION

The present invention relates to a multilayer film. More particularly, the multilayer film is an interlayer film for laminated glass. The present invention also relates to an interlayer film and a laminated glass comprising the same. The laminated glass obtained using the interlayer film has excellent sound insulating properties.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Polyvinyl acetal resin has excellent film formation properties and has a unique chemical structure so as to have good adhesion to glasses, metals, ceramic powders, plastics, leathers, and wood. Since polyvinyl acetal resin has various excellent physical properties, it is widely used in the interlayer film for bonding of safety glass used in automobiles and buildings, wash primer, baking varnish, wood lacquer, printing ink, adhesive for electronic ceramic and printed circuit board, metal and metal, metal and plastic, modifiers for hot melt adhesive, and so forth. New uses are also being developed and applied continuously in various industries.

The aforesaid safety glass is usually a laminated glass, also known as a sandwich glass. The laminated glass is held in place by an interlayer film, typically of polyvinyl butyral (PVB) or ethylene-vinyl acetate (EVA), positioned between two or more layers of glass. Laminated glass possesses good safety features because it produces only a small amount of glass fragments when subjected to an external impact. As such, laminated glass is widely utilized in many fields like vehicles, boats, visors, and buildings. On the other hand, laminated glass also possesses good sound-insulating property.

SUMMARY OF THE INVENTION

Laminated glass and the interlayer film used in the laminated glass are a well-known technique in the art. However, the three-layer structure used in the known laminated glass usually uses the same type of plasticizer for each layer so that the plasticizer would migrate between the different layers. This phenomenon may result in an interface instability, which may cause foaming during product manufacturing. Furthermore, the known technique for increasing the amount of plasticizer of the intermediate layer (also known as a sound-insulating layer) so as to elevate the sound-insulating property is to increase the Ac (Acetyl) group or the Bu (Butyral) group content. However, the PVB resin, for example, containing high content of Ac group is not easily produced, accordingly, Ac group content of the resin is limited. Therefore, it is an objective of the present invention to provide a multilayer film and interlayer film, a laminated glass, and a sound-insulating glass laminate comprising the same having improved properties such as enhancing sound insulating effect and preventing the migration of plasticizer contained in the film or in the glass.

In various embodiments, the present invention provides a multilayer film. In some embodiments, the multilayer film is an interlayer film for laminated glass. In some embodiments, the interlayer film has such characteristics as transparency, weather resistance, impact energy absorbing properties, adhesion to glass, and excellent sound insulating properties over a wide temperature range for a prolonged period of time.

In various embodiments, the present invention provides a multilayer film, comprising: a resin film (A) comprising a polyvinyl acetal resin (a1) and a plasticizer (a2); a resin film (B) comprising a polyvinyl acetal resin (b1) and a plasticizer (b2); and a resin film (C) comprising a polyvinyl acetal resin (c1) and a plasticizer (c2), wherein the resin film (B) is positioned between the resin film (A) and the resin film (C); wherein the polyvinyl acetal resin (a1), the polyvinyl acetal resin (b1) and the polyvinyl acetal resin (c1) each independently have a hydroxyl group content ratio; and the hydroxyl group content ratio of the polyvinyl acetal resin (b1) is greater than the hydroxyl group content ratio of each of the polyvinyl acetal resin (a1) and the polyvinyl acetal resin (c1); and the polyvinyl acetal resin (b1) has a degree of acetalization of less than 60 mol %.

In some embodiments, the polyvinyl acetal resin (a1) and the polyvinyl acetal resin (c1) each independently have a degree of acetalization; and the degree of acetalization of the polyvinyl acetal resin (b1) is less than the degree of acetalization of the polyvinyl acetal resin (a1) and the polyvinyl acetal resin (c1).

In some embodiments, the polyvinyl acetal resin (a1), the polyvinyl acetal resin (b1) and the polyvinyl acetal resin (c1) each independently have a degree of acetylation; and the degree of acetylation of the polyvinyl acetal resin (b1) is greater than the degree of acetylation of the polyvinyl acetal resin (a1) and the polyvinyl acetal resin (c1).

In some embodiments, the difference between the hydroxyl group content ratio of the polyvinyl acetal resin (b1) and the hydroxyl group content ratio of the polyvinyl acetal resin (a1) is greater than 5; and the difference between the hydroxyl group content ratio of the polyvinyl acetal resin (b1) and the hydroxyl group content ratio of the polyvinyl acetal resin (c1) is greater than 5.

In some embodiments, the difference between the degree of acetalization of the polyvinyl acetal resin (b1) and the degree of acetalization of the polyvinyl acetal resin (a1) is greater than 5; and the difference between the degree of acetalization of the polyvinyl acetal resin (b1) and the degree of acetalization of the polyvinyl acetal resin (c1) is greater than 5.

In some embodiments, the plasticizer (b2) is different from the plasticizer (a2) and the plasticizer (c2).

In some embodiments, the plasticizer (b2) has a solubility parameter (calculated from Fedors' equation) of greater than or equal to 9.06.

In some embodiments, the plasticizer (a2) and the plasticizer (c2) each independently have a solubility parameter; and the solubility parameter of the plasticizer (b2) is greater than the solubility parameter of the plasticizer (a2) and the plasticizer (c2).

In some embodiments, the degree of acetalization of the polyvinyl acetal resin (a1) is greater than 65 mol %.

In some embodiments, the degree of acetalization of the polyvinyl acetal resin (c1) is greater than 65 mol %.

In some embodiments, the degree of acetylation of the polyvinyl acetal resin (b1) is greater than 5 mol %; and the hydroxyl group content ratio of the polyvinyl acetal resin (b1) is greater than 35 mol %.

In some embodiments, the acetylation degree of the polyvinyl acetal resin (a1) is less than 5 mol %; and the hydroxyl group content ratio of the polyvinyl acetal resin (a1) is less than 30 mol %.

In some embodiments, the acetylation degree of the polyvinyl acetal resin (c1) is less than 5 mol %; and the hydroxyl group content ratio of the polyvinyl acetal resin (c1) is less than 30 mol %.

In some embodiments, the plasticizer (b2) is selected from the group consisting of dihexyl adipate (DHA), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), triethylene glycol di-n-heptanoate (3G7), glycerol, ethylene glycol, 2,2,4-trimethyl-1,3-pentanediol monoisobutyrate (Texanol) (CAS No. 25265-77-4), dipentaerythritol hexaoctoate (CAS No. 827135-99-7), and bis[2-(2-butoxyethoxy)ethyl] adipate (D600) (CAS No. 141-17-3), dibutyl phthalate (DBP), diethylene glycol dibenzonate (CAS No. 120-55-8), dipropylene glycol dibenzonate (CAS No. 27138-31-4), and combinations thereof.

In some embodiments, the amount of the plasticizer (b2) is from 50 PHR to 90 PHR, wherein PHR is the weight parts of the plasticizer (b2) per 100 weight parts of the polyvinyl acetal resin (b1).

In various embodiments, the present invention provides an interlayer film for laminated glass, comprising the aforesaid multilayer film. In some embodiments, the present invention provides a laminated glass comprising the aforesaid the interlayer film, wherein the interlayer film is interposed between two transparent sheets. In some embodiments, the laminated glass has a loss factor of greater than or equal to 0.250 as measured according to ISO 16940-2008. In some embodiments, the laminated glass has little or no plasticizer bleed-out as measured according to the test method for the evaluation of plasticizer bleed-out as set out herein.

In various embodiments, the present invention provides a sound-insulating glass laminate, comprising: an interlayer film comprising the aforesaid interlayer film, wherein the interlayer film is interposed between two transparent sheets of glass.

In various embodiments, the present invention provides a multilayer film, comprising: a resin film (A); a resin film (B); and a resin film (C), wherein the resin film (B) is positioned between the resin film (A) and the resin film (C); wherein the resin film (B) comprises a polyvinyl acetal resin (b1) and a plasticizer (b2), where the plasticizer (b2) has a SP value of greater than or equal to 9.06, and the polyvinyl acetal resin (b1) has a degree of acetalization of less than 60 mol %.

As above, compared to the prior art, the present invention improves the compatibility of the resin film (B) with the plasticizer so that the intermediate layer (i.e., the resin film (B)) allows to add more plasticizer(s) to achieve the effect for enhancing sound-insulating. Furthermore, the intermediate layer of the multilayer film uses different plasticizer(s) from the non-intermediate layer of the multilayer film so as to prevent the migration of plasticizers between different layers.

BRIEF DESCRIPTION OF THE DRAWINGS

Exemplary embodiments are illustrated in referenced figures. It is intended that the embodiments and figures disclosed herein are to be considered illustrative rather than restrictive.

DETAILED DESCRIPTION OF THE INVENTION

Figure 1:
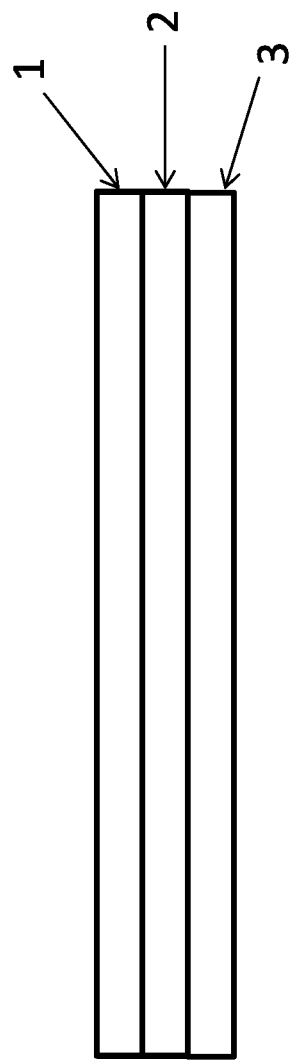
FIG. 1 depicts in accordance with various embodiments of the invention, a schematic representation of a laminated glass, where (1) represents a glass sheet; (2) represents an interlayer film; and (3) represents a glass sheet.

All references cited herein are incorporated by reference in their entirety as though fully set forth.

The following embodiments and aspects thereof are described and illustrated in conjunction with systems, articles of manufacture, compositions and methods which are meant to be exemplary and illustrative, not limiting in scope. One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described.

For convenience, certain terms employed herein, in the specification, examples and appended claims are collected here. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the invention, or embodiments thereof, may alternatively be described using alternative terms such as "consisting of" or "consisting essentially of."

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context.

The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not.

The term "parts per hundred parts of resin" or "PHR" is commonly used in the art of resin compositions and/or resin films, and refers to weight parts of a component (e.g., a plasticizer, or an additive) in a resin film (or called resin composition) per 100 parts by weight of a resin (e.g., a polyvinyl acetal resin), wherein the weight parts of the resin is the total amount of the resin used in the resin film (or called resin composition). Hence, if more than one resin (e.g., a mixture of resins is used, such as a mixture of a polyvinyl acetal resin (a1) and a polyvinyl acetal resin (b1)), the PHR is calculated on the basis of the total weight amount of the resin mixture.

In the disclosure, the term "SP" refers to a solubility parameter of a resin, a resin film, a resin composition, a plasticizer or their combinations. The solubility parameter (δ) (i.e., SP value) is calculated based on the following Fedors' equation.

Fedors' equation $$\text{Solubility Parameter } (\delta) = \left( \frac{\sum_i \Delta e_i}{\sum_i \Delta v_i} \right)^{1/2} \quad \text{(Eq. 1)}$$

$\Delta e_i$: evaporation energy of each atom or atom group
$\Delta v_i$: molar volume of each atom or atom group The evaporation energy ($\Delta e_i$) and molar volume ($\Delta v_i$) of each atom or atom group, which are used for the calculation of the solubility parameter (δ), are provided in Table 5 of R. F. Fedors, Polym. Eng. Sci., 14, 147 (1974).

The solubility parameter (δ) of the plasticizers was calculated from Fedors' equation (Eq. 1) and the results are listed in the following Table 1.

TABLE 1

Solubility Parameter of the Plasticizers

| Plasticizer | Atom or Group | | | | | | | | $\Sigma_i \Delta e_i$ (cal/mole) | $\Sigma_i \Delta v_i$ (cm³/mole) | Solubility Parameter (δ) |
| --- | --- | --- | --- | --- | --- | --- | --- | --- | --- | --- | --- |
| | CH$_3$ | CH$_2$ | CH | C | CO$_2$ | O | OH | Phenyl | | | |
| 3GO | 4 | 14 | 2 | 0 | 2 | 2 | 0 | 0 | 32860 | 401 | 9.05 |
| D600 | 2 | 18 | 0 | 0 | 2 | 4 | 0 | 0 | 35290 | 408 | 9.30 |
| 4G7 | 2 | 18 | 0 | 0 | 2 | 3 | 0 | 0 | 34490 | 404.2 | 9.24 |
| Ethylene Glycol | 0 | 2 | 0 | 0 | 0 | 0 | 2 | 0 | 12800 | 58.2 | 14.83 |
| Texanol | 6 | 1 | 3 | 1 | 1 | 0 | 1 | 0 | 20260 | 225.9 | 9.47 |
| Glycerol | 0 | 2 | 1 | 0 | 0 | 0 | 3 | 0 | 18840 | 70.2 | 16.38 |
| 4GO | 4 | 16 | 2 | 0 | 2 | 3 | 0 | 0 | 36020 | 437 | 9.08 |
| 4GH | 4 | 12 | 2 | 0 | 2 | 3 | 0 | 0 | 31300 | 372.6 | 9.17 |
| 3G7 | 2 | 16 | 0 | 0 | 2 | 2 | 0 | 0 | 31330 | 368.2 | 9.22 |
| 3GH | 4 | 10 | 2 | 0 | 2 | 2 | 0 | 0 | 28140 | 336.6 | 9.14 |
| DHA | 2 | 14 | 0 | 0 | 2 | 0 | 0 | 0 | 27370 | 328.4 | 9.13 |
| Diethylene glycol dibenzoate | 0 | 4 | 0 | 0 | 2 | 1 | 0 | 2 | 29380 | 247 | 10.91 |
| Dipropylene glycol dibenzoate | 2 | 2 | 2 | 0 | 2 | 1 | 0 | 2 | 30910 | 279.8 | 10.51 |
| D827 | — | — | — | — | — | — | — | — | — | — | 10.51~10.91 |

NOTE:

D827 is a mixture of diethylene glycol dibenzoate and dipropylene glycol dibenzoate with mixing ratio of 50~60%:50~40% (by weight). The SP value of D827 is between the SP value of diethylene glycol dibenzoate and dipropylene glycol dibenzoate, namely, the SP value of D827 is in the range of 10.51~10.91.

In the disclosure, the term "sound-insulating" was evaluated by loss factor. The loss factor of the laminated glass test specimens was analyzed with the MIM (Mechanical Impedance Method) system according to reference ISO 16940-2008. The larger the loss factor value, the more sound insulating the laminated glass is. The dimensions of the laminated glass test specimens were 25±2 mm width and 300±1 mm length.

Figure 2:
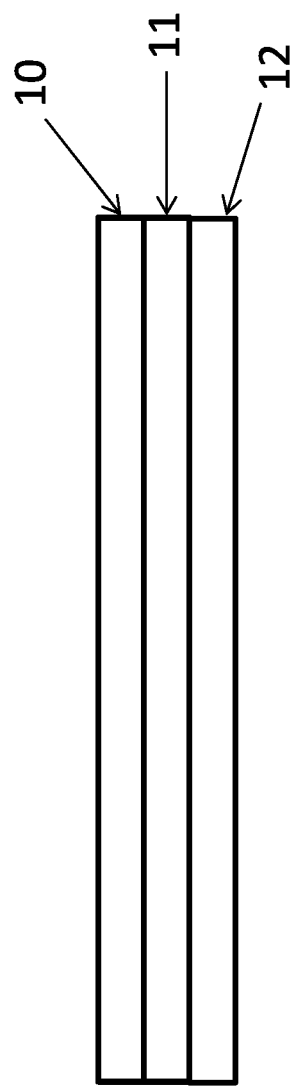
FIG. 2 depicts in accordance with various embodiments of the invention, a schematic representation of a multilayer film, where (10) represents a resin film (A); (11) represents a resin film (B); and (12) represents a resin film (C).

In the disclosure, the term "plasticizer bleed-out" was used to evaluate a migration of plasticizer. The migration of plasticizer results in an interface instability, which may cause foaming during processing, and causes the plasticizer bleed-out. Evaluation of plasticizer bleed-out was conducted using a marker pen to write a symbol on one side of the intermediate layer of the multilayer film (e.g. Resin Film (B) 11 in FIG. 2). As shown in FIG. 1 and FIG. 2, a laminated glass sample was prepared by laying-up the obtained resin films with sheets of glass in the order: Glass Sheet 1/multilayer film (e.g. Resin Film (A) 10/Resin Film (B) 11/Resin Film (C) 12)/Glass Sheet 3. A hot-presser (GOTECH, Taiwan, GT-7014-A) was used to prepress the laminated glass sample at 150° C. for 3 minutes. Following the prepress procedure, the laminated glass sample was autoclaved at 13 bar and 135° C. for 120 minutes and subsequently cooled to ambient temperature to complete the lamination process. The laminated glass sample was visually evaluated using the following method: if the edge of the symbol was blurry, then the sample was judged as having much bleed-out; if the edge of the symbol was not blurry, then the sample was judged as having little or no bleed-out.

In the disclosure, the term "acetalization degree" or "degree of acetalization" refers to the amount of acetal groups of the polyvinyl acetal resin. The acetalization degree of the polyvinyl acetal resin (e.g., polyvinyl acetal resin (a1), polyvinyl acetal resin (b1), and/or polyvinyl acetal resin (c1)) is a value expressing the mole fraction determined by dividing the amount of ethylene groups to which the acetal group is bonded by the total amount of ethylene groups in the main chain in terms of percentage. The amount of ethylene groups to which the acetal group is bonded was measured in accordance with JIS K6728 "Testing methods for polyvinyl butyral" or in accordance with ASTM D1396-92.

In the disclosure, the term "acetylation degree" or "content ratio of the acetyl group" or "degree of acetylation" or "acetylation degree" refers to the amount of acetyl groups of the polyvinyl acetal resin. The acetylation degree of the polyvinyl acetal resin (e.g., polyvinyl acetal resin (a1), polyvinyl acetal resin (b1), and/or polyvinyl acetal resin (c1)) is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. The amount of ethylene groups to which the acetal group is bonded was measured in accordance with JIS K6728 "Testing methods for polyvinyl butyral" or in accordance with ASTM D1396-92. The amount of ethylene groups to which the hydroxyl group is bonded was measured in accordance with JIS K6726 "Testing methods for polyvinyl alcohol" or in accordance with ASTM D1396-92.

In the disclosure, the term "hydroxyl group content ratio" or "content ratio of the hydroxyl group" refers to the amount of hydroxyl groups of the polyvinyl acetal resin. The content ratio of the hydroxyl group of the polyvinyl acetal resin (e.g., polyvinyl acetal resin (a1), polyvinyl acetal resin (b1), and/or polyvinyl acetal resin (c1)) is a value expressing the mole fraction determined by dividing the amount of ethylene groups to which the hydroxyl group is bonded by the total amount of ethylene groups in the main chain in terms of percentage. The amount of ethylene groups to which the hydroxyl group is bonded was measured in accordance with JIS K6726 "Testing methods for polyvinyl alcohol" or in accordance with ASTM D1396-92.

Synthetic Preparation. In various embodiments, polyvinyl acetal resins (e.g., polyvinyl acetal resin (a1), polyvinyl acetal resin (b1), and/or polyvinyl acetal resin (c1)) of the present invention as disclosed herein may be synthesized using any synthetic method available to one of skill in the art. The starting materials used in preparing polyvinyl acetal resins may be commercially available or prepared by known methods. Preparation of compounds, and polyvinyl acetal resins, can involve the protection and deprotection of various chemical groups. The need for protection and deprotection, and the selection of appropriate protecting groups can be readily determined by one skilled in the art. The chemistry of protecting groups can be found, for example, in Greene and Wuts, Protective Groups in Organic Synthesis, 44th. Ed., Wiley & Sons, 2006, which is incorporated herein by reference in its entirety. Non-limiting examples of synthetic methods used to prepare various embodiments of polyvinyl acetal resins of the present invention are disclosed in the Examples section herein. The reactions of the processes described herein can be carried out in suitable solvents which can be readily selected by one of skill in the art of organic synthesis. Suitable solvents can be substantially nonreactive with the starting materials (reactants), the intermediates, or products at the temperatures at which the reactions are carried out, i.e., temperatures which can range from the solvent's freezing temperature to the solvent's boiling temperature. A given reaction can be carried out in one solvent or a mixture of more than one solvent. Depending on the particular reaction step, suitable solvents for a particular reaction step can be selected.

Multilayer Film

The schematic representations shown in FIG. 1 and FIG. 2 can be used with the resin materials provided herein.

The present invention is directed to a multilayer film comprising: a resin film (A) 10 comprising a polyvinyl acetal resin (a1) and a plasticizer (a2); a resin film (B) 11 comprising a polyvinyl acetal resin (b1) and a plasticizer (b2); and a resin film (C) 12 comprising a polyvinyl acetal resin (c1) and a plasticizer (c2), wherein the resin film (B) 11 is positioned (e.g., sandwiched) between the resin film (A) 10 and the resin film (C) 12. In various embodiments, the resin film (A) 10 and the resin film (C) 12 are the same (i.e., resin film (A) 10 and resin film (C) 12 have the same composition and/or the same properties), and the resin film (B) 11 is different from resin film (A) 10 and/or resin film (C) 12 (i.e., resin film (B) 11 has a different composition and/or different properties than resin film (A) 10 and/or resin film (C) 12). In various embodiments, the resin film (A) 10, the resin film (B) 11, and the resin film (C) 12 are independently different (i.e., resin film (A) 10, resin film (B) 11, and resin film (C) 12 each have a different composition or different properties).

In various embodiments, a "multilayer film" or a "multilayer polymer film" (or related terminology) is intended as a laminated sheet/film material of several constructions. The multilayer film of the present invention can be widely utilized for automobiles, aircraft, railway vehicles, boats, buildings, and the like.

In various embodiments, the resin film (A) 10 and the resin film (C) 12 are protective layers, and the resin film (B) 11 is a sound-insulating layer.

There are no limitations on the geometry and/or shape of the multilayer film as described herein. For example, in various embodiments the present invention provides a multilayer film, where the shape/geometry of the multilayer film is not limited to being planar (e.g., flat), as the multilayer film may have any geometry and/or shape (e.g., flat, planar, curved, circular, elliptical, spherical, triangular, rectangular, dome shaped, pyramid shaped, etc.).

Resin Film (B) 11

In various embodiments, the resin film (B) 11 comprises a polyvinyl acetal resin (b1) and at least one plasticizer (b2). In some embodiments, the resin film (B) 11 further comprises at least one additive.

In various embodiments, the polyvinyl acetal resin (b1) is prepared by acetalization of (i.e., acetalizing) a polyvinyl alcohol (b1.1) with an aldehyde (b1.2). In some embodiments, the polyvinyl acetal resin (b1) is prepared by acetalization of at least one polyvinyl alcohol (b1.1) with at least one aldehyde (b1.2). In various embodiments, the polyvinyl acetal resin (b1) has an acetalization degree of less than or equal to 60 mol %. In various embodiments, the polyvinyl acetal resin (b1) has an acetalization degree of 60 mol % to 30 mol %, 60 mol % to 35 mol %, 60 mol % to 40 mol %, 60 mol % to 45 mol %, 60 mol % to 50 mol %, or 60 mol % to 55 mol %. In various embodiments, the polyvinyl acetal resin (b1) has an acetalization degree of 59.9 mol % to 30 mol %, 59.9 mol % to 35 mol %, 59.9 mol % to 40 mol %, 59.9 mol % to 45 mol %, 59.9 mol % to 50 mol %, or 59.9 mol % to 55 mol %. In various embodiments, the polyvinyl acetal resin (b1) has an acetalization degree of 59 mol % to 30 mol %, 59 mol % to 35 mol %, 59 mol % to 40 mol %, 59 mol % to 45 mol %, 59 mol % to 50 mol %, 59 mol % to 55 mol %, 56 mol % to 30 mol %, 56 mol % to 35 mol %, 56 mol % to 40 mol %, 56 mol % to 45 mol %, or 56 mol % to 50 mol %. In one preferred embodiment, the polyvinyl acetal resin (b1) has an acetalization degree of 59 mol % to 40 mol %, for example, 59 mol %, 58.5 mol %, 58 mol %, 57.5 mol %, 57 mol %, 56.5 mol %, 56 mol %, 55.5 mol %, 55 mol %, 54.5 mol %, 54 mol %, 53.5 mol %, 53 mol %, 52.5 mol %, 52 mol %, 51.5 mol %, 51 mol %, 50.5 mol %, 50 mol %, 49.5 mol %, 49 mol %, 48.5 mol %, 48 mol %, 47.5 mol %, 47 mol %, 46.5 mol %, 46 mol %, 45.5 mol %, 45 mol %, 44.5 mol %, 44 mol %, 43.5 mol %, 43 mol %, 42.5 mol %, 42 mol %, 41.5 mol %, 41 mol %, 40.5 mol %, or 40 mol %. In various embodiments, the polyvinyl acetal resin (a1) and the polyvinyl acetal resin (c1) also each independently have a degree of acetalization; and the degree of acetalization of the polyvinyl acetal resin (b1) is less than the degree of acetalization of the polyvinyl acetal resin (a1) and the polyvinyl acetal resin (c1). In various embodiments, the difference between the degree of acetalization of the polyvinyl acetal resin (b1) and the degree of acetalization of the polyvinyl acetal resin (a1) is greater than 5. In various embodiments, the difference between the degree of acetalization of the polyvinyl acetal resin (b1) and the degree of acetalization of the polyvinyl acetal resin (c1) is greater than 5. In one preferred embodiment, the difference between the degree of acetalization of the polyvinyl acetal resin (b1) and the degree of acetalization of the polyvinyl acetal resin (a1) is greater than 5; and the difference between the degree of acetalization of the polyvinyl acetal resin (b1) and the degree of acetalization of the polyvinyl acetal resin (c1) is greater than 5.

The number of carbon atoms of the acetal group contained in the polyvinyl acetal resin (b1) is not particularly limited. In some embodiments, the number of carbon atoms of the acetal group in the polyvinyl acetal resin (b1) may be from 1 to 12. That is the aldehyde (b1.2) used to produce the polyvinyl acetal resin (b1) is an aldehyde that has 1 to 12 carbons. In some embodiments the number of carbon atoms of the acetal group in the polyvinyl acetal resin (b1) may be 1 or more. That is the aldehyde (b1.2) used to produce the polyvinyl acetal resin (b1) is an aldehyde that has 1 or more carbons. In some embodiments the number of carbon atoms of the acetal group in the polyvinyl acetal resin (b1) may be 2 or more. That is the aldehyde (b1.2) used to produce the polyvinyl acetal resin (b1) is an aldehyde that has 2 or more carbons. In some embodiments the number of carbon atoms of the acetal group in the polyvinyl acetal resin (b1) may be 3 or more. That is the aldehyde (b1.2) used to produce the polyvinyl acetal resin (b1) is an aldehyde that has 3 or more carbons. In some embodiments the number of carbon atoms of the acetal group in the polyvinyl acetal resin (b1) may be 4 or more. That is the aldehyde (b1.2) used to produce the polyvinyl acetal resin (b1) is an aldehyde that has 4 or more carbons. In some embodiments the number of carbon atoms of the acetal group in the polyvinyl acetal resin (b1) may be 5 or more. That is the aldehyde (b1.2) used to produce the polyvinyl acetal resin (b1) is an aldehyde that has 5 or more carbons.

The aldehyde (b1.2) can be one kind of aldehyde or a mixture or combination of two or more aldehydes. The aldehyde for use as aldehyde (b1.2) is not particularly limited. In general, an aldehyde with 1-12 carbon atoms is suitably used as aldehyde (b1.2). In some embodiments, the aldehyde (b1.2) is selected from the group consisting of a $C_1$-$C_{12}$ aldehyde, a linear or straight chain aldehyde, a cyclic aldehyde, an aromatic aldehyde, an acyclic aldehyde, a branched aldehyde, a dialdehyde, a multialdehyde, a functionalized aldehyde, a substituted aldehyde, and combinations thereof. In some embodiments, the aldehyde (b1.2) is selected from the group consisting of a $C_1$-$C_{10}$ aldehyde, a linear or straight chain aldehyde, a cyclic aldehyde, an aromatic aldehyde, an acyclic aldehyde, a branched aldehyde, a dialdehyde, a multialdehyde, a functionalized aldehyde, a substituted aldehyde, and combinations thereof. Non-limiting examples of aldehydes suitable for use as aldehyde (b1.2) include formaldehyde (including paraformaldehyde), acetaldehyde (including paracetaldehyde), propionaldehyde, n-butyraldehyde, isobutyraldehyde, n-valeraldehyde, 2-ethylbutyraldehyde, n-hexylaldehyde, n-heptylaldehyde, n-octylaldehyde, n-nonylaldehyde, n-decylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, 2-ethylhexylaldehyde, 2-ethylbutylaldehyde, cinnamaldehyde, n-undecylaldehyde, n-dodecylaldehyde, and the like. In some embodiments aldehyde (b1.2) is selected from the group consisting of formaldehyde, acetaldehyde, n-butyraldehyde, isobutyraldehyde, cyclohexylaldehyde, benzaldehyde, and combinations thereof. In some embodiments, aldehyde (b1.2) is selected from the group consisting of n-butyraldehyde isobutyraldehyde, and combinations thereof. In some embodiments, aldehyde (b) is selected from n-butyraldehyde.

In one preferred embodiment, the polyvinyl acetal resin (b1) is a polyvinyl butyral resin. In some embodiments, the polyvinyl butyral resin is prepared by reaction (acetalization) of polyvinyl alcohol with n-butyraldehyde.

Except for the acetalization degree, the polyvinyl acetal resin (b1) also has a hydroxyl group content ratio and an acetylation degree which can be used to present the characteristics of the polyvinyl acetal resin (b1). In various embodiments, the polyvinyl acetal resin (b1) has a hydroxyl group content ratio of greater than or equal to 35 mol %. In various embodiments, the polyvinyl acetal resin (b1) has a hydroxyl group content ratio of 35 mol % to 70 mol %, 35 mol % to 65 mol %, 35 mol % to 60 mol %, 35 mol % to 55 mol %, 35 mol % to 50 mol %, 35 mol % to 45 mol %, 35 mol % to 40 mol %, 40 mol % to 70 mol %, 40 mol % to 65 mol %, 40 mol % to 60 mol %, 40 mol % to 55 mol %, 40 mol % to 50 mol %, 40 mol % to 45 mol %, 45 mol % to 70 mol %, 45 mol % to 65 mol %, 45 mol % to 60 mol %, 45 mol % to 55 mol %, 45 mol % to 50 mol %, 50 mol % to 70 mol %, 50 mol % to 65 mol %, 50 mol % to 60 mol %, 50 mol % to 55 mol %, 55 mol % to 70 mol %, 55 mol % to 65 mol %, 55 mol % to 60 mol %, 60 mol % to 70 mol %, 60 mol % to 65 mol %, or 65 mol % to 70 mol %. In one preferred embodiment, the polyvinyl acetal resin (b1) has a hydroxyl group content ratio of 35 mol % to 50 mol %, for example, 35 mol %, 35.5 mol %, 36 mol %, 36.5 mol %, 37 mol %, 37.5 mol %, 38 mol %, 38.5 mol %, 39 mol %, 39.5 mol %, 40 mol %, 40.5 mol %, 41 mol %, 41.5 mol %, 42 mol %, 42.5 mol %, 43 mol %, 43.5 mol %, 44 mol %, 44.5 mol %, 45 mol %, 45.5 mol %, 46 mol %, 46.5 mol %, 47 mol %, 47.5 mol %, 48 mol %, 48.5 mol %, 49 mol %, 49.5 mol %, or 50 mol %. In various embodiments, the polyvinyl acetal resin (a1) and the polyvinyl acetal resin (c1) also each independently have a hydroxyl group content ratio; and the hydroxyl group content ratio of the polyvinyl acetal resin (b1) is greater than the hydroxyl group content ratio of the polyvinyl acetal resin (a1) and the polyvinyl acetal resin (c1). In various embodiments, the difference between the hydroxyl group content ratio of the polyvinyl acetal resin (b1) and the hydroxyl group content ratio of the polyvinyl acetal resin (a1) is greater than 5. In various embodiments, the difference between the hydroxyl group content ratio of the polyvinyl acetal resin (b1) and the hydroxyl group content ratio of the polyvinyl acetal resin (c1) is greater than 5. In one preferred embodiment, the difference between the hydroxyl group content ratio of the polyvinyl acetal resin (b1) and the hydroxyl group content ratio of the polyvinyl acetal resin (a1) is greater than 5; and the difference between the hydroxyl group content ratio of the polyvinyl acetal resin (b1) and the hydroxyl group content ratio of the polyvinyl acetal resin (c1) is greater than 5.

In various embodiments, the polyvinyl acetal resin (b1) has an acetylation degree of greater than or equal to 5 mol %. In various embodiments, the polyvinyl acetal resin (b1) has an acetylation degree of 5 mol % to 30 mol %, 5 mol % to 25 mol %, 5 mol % to 20 mol %, 5 mol % to 15 mol %, or 5 mol % to 10 mol %. In various embodiments, the polyvinyl acetal resin (b1) has an acetylation degree of 5.1 mol % to 30 mol %, 5.1 mol % to 25 mol %, 5.1 mol % to 20 mol %, 5.1 mol % to 15 mol %, or 5.1 mol % to 10 mol %. In various embodiments, the polyvinyl acetal resin (b1) has an acetylation degree of 6 mol % to 30 mol %, 6 mol % to 25 mol %, 6 mol % to 20 mol %, 6 mol % to 15 mol %, or 6 mol % to 10 mol %. In various embodiments, the polyvinyl acetal resin (b1) has an acetylation degree of greater than 5 mol %. In one preferred embodiment, the polyvinyl acetal resin (b1) has an acetylation degree of 6 mol % to 15 mol %, for example, 6 mol %, 6.5 mol %, 7 mol %, 7.5 mol %, 8 mol %, 8.5 mol %, 9 mol %, 9.5 mol %, 10 mol %, 10.5 mol %, 11 mol %, 11.5 mol %, 12 mol %, 12.5 mol %, 13 mol %, 13.5 mol %, 14 mol %, 14.5 mol %, or 15 mol %. In a more preferred embodiment, the polyvinyl acetal resin (b1) has an acetylation degree of greater than 5 mol %; and a hydroxyl group content ratio of greater than 35 mol %. In various embodiments, the polyvinyl acetal resin (a1) and the polyvinyl acetal resin (c1) also each independently have a degree of acetylation; and the degree of acetylation of the polyvinyl acetal resin (b1) is greater than the degree of acetylation of the polyvinyl acetal resin (a1) and the polyvinyl acetal resin (c1).

In various embodiments, the plasticizer (b2) is different from the plasticizer (a2) and the plasticizer (c2). In various embodiments, plasticizer (b2) has a SP of greater than or equal to 9.06. In various embodiments, plasticizer (b2) has a SP of 9.06 to 16.40, 9.06 to 16.38, 9.06 to 16.25, 9.06 to 16.00, 9.06 to 15.75, 9.06 to 15.50, 9.06 to 15.25, 9.06 to 15.00, 9.06 to 14.75, 9.06 to 14.50, 9.06 to 14.25, 9.06 to 14.00, 9.06 to 13.75, 9.06 to 13.50, 9.06 to 13.25, 9.06 to 13.00, 9.06 to 12.75, 9.06 to 12.50, 9.06 to 12.25, 9.06 to 12.00, 9.06 to 11.75, 9.06 to 11.50, 9.06 to 11.25, 9.06 to 11.00, 9.06 to 10.75, 9.06 to 10.50, 9.06 to 10.25, 9.06 to 10.00, 9.06 to 9.75, 9.06 to 9.50, 9.06 to 9.30, or 9.06 to 9.25. In various embodiments, the polyvinyl acetal resin (b1) has a degree of acetalization of less than 60 mol %, and the plasticizer (b2) has a SP value that is greater than or equal to 9.06. In various embodiments, the plasticizer (a2) and the plasticizer (c2) each independently have a solubility parameter; and the solubility parameter of the plasticizer (b2) is greater than the solubility parameter of the plasticizer (a2) and the plasticizer (c2).

In some embodiments, the plasticizer (b2) has a SP value that is greater than the SP value of 3GO. In some embodiments, the plasticizer (b2) is not 3GO. Non-limiting examples of plasticizers suitable for use as the plasticizer (b2) include organic ester plasticizers such as monobasic organic acid esters and polybasic organic acid esters, where the organic ester plasticizers have a SP value of greater than or equal to 9.06. Non-limiting examples of plasticizers suitable for use as the plasticizer (b2) include phosphate plasticizers such as organic phosphate plasticizers and organic phosphite plasticizers, where the organic ester plasticizers have a SP value of greater than or equal to 9.06. Other non-limiting examples of plasticizers suitable for use as the plasticizer (b2) include epoxy, epoxies, or various epoxy resins, wherein the epoxy, epoxies, or various epoxy resins each independently have a SP value of greater than or equal to 9.06. In various embodiments, the plasticizer (b2) is selected from the group consisting of diethylene glycol dibenzoate, dipropylene glycol dibenzoate, DHA, 4GO, 3GH, 4GH, 4G7, 3G7, DBP, glycerol, ethylene glycol, Texanol, dipentaerythritol hexaoctoate, D600, and combinations thereof.

An amount of the plasticizer (b2) in the resin film (B) is expressed as the amount of the plasticizer (b2) in PHR, wherein PHR is the weight parts of the plasticizer (b2) per 100 weight parts of the polyvinyl acetal resin (b1). In various embodiments, the amount of the plasticizer (b2) in the resin film (B) 11 is from 0.1 PHR to 100 PHR of the plasticizer (b2). In various embodiments the amount of the plasticizer (b2) in resin film (B) 11 is from 0.1 PHR to 100 PHR, 1 PHR to 100 PHR, 5 PHR to 100 PHR, 10 PHR to 100 PHR, 20 PHR to 100 PHR, 30 PHR to 100 PHR, 40 PHR to 100 PHR, 50 PHR to 100 PHR, 60 PHR to 100 PHR, 70 PHR to 100 PHR, 80 PHR to 100 PHR, 90 PHR to 100 PHR, 0.1 PHR to 90 PHR, 1 PHR to 90 PHR, 5 PHR to 90 PHR, 10 PHR to 90 PHR, 20 PHR to 90 PHR, 30 PHR to 90 PHR, 40 PHR to 90 PHR, 50 PHR to 90 PHR, 60 PHR to 90 PHR, 70 PHR to 90 PHR, 80 PHR to 90 PHR, 0.1 PHR to 80 PHR, 1 PHR to 80 PHR, 5 PHR to 80 PHR, 10 PHR to 80 PHR, 20 PHR to 80 PHR, 30 PHR to 80 PHR, 40 PHR to 80 PHR, 50 PHR to 80 PHR, 60 PHR to 80 PHR, 70 PHR to 80 PHR, 0.1 PHR to 70 PHR, 1 PHR to 70 PHR, 5 PHR to 70 PHR, 10 PHR to 70 PHR, 20 PHR to 70 PHR, 30 PHR to 70 PHR, 40 PHR to 70 PHR, 50 PHR to 70 PHR, 60 PHR to 70 PHR, 0.1 PHR to 60 PHR, 1 PHR to 60 PHR, 5 PHR to 60 PHR, 10 PHR to 60 PHR, 20 PHR to 60 PHR, 30 PHR to 60 PHR, 40 PHR to 60 PHR, 50 PHR to 60 PHR, 0.1 PHR to 50 PHR, 1 PHR to 50 PHR, 5 PHR to 50 PHR, 10 PHR to 50 PHR, 20 PHR to 50 PHR, 30 PHR to 50 PHR, 40 PHR to 50 PHR, 0.1 PHR to 40 PHR, 1 PHR to 40 PHR, 5 PHR to 40 PHR, 10 PHR to 40 PHR, 20 PHR to 40 PHR, 30 PHR to 40 PHR, 0.1 PHR to 30 PHR, 1 PHR to 30 PHR, 5 PHR to 30 PHR, 10 PHR to 30 PHR, 20 PHR to 30 PHR, 0.1 PHR to 20 PHR, 1 PHR to 20 PHR, 5 PHR to 20 PHR, 10 PHR to 20 PHR, 0.1 PHR to 10 PHR, 1 PHR to 10 PHR, 5 PHR to 10 PHR, 0.1 PHR to 5 PHR, 1 PHR to 5 PHR, or 0.1 PHR to 1 PHR of the plasticizer (b2). In one preferred embodiment, the amount of the plasticizer (b2) in resin film (B) 11 is from 50 PHR to 90 PHR of the plasticizer (b2), for example, 50 PHR, 51 PHR, 52 PHR, 53 PHR, 54 PHR, 55 PHR, 56 PHR, 57 PHR, 58 PHR, 59 PHR, 60 PHR, 61 PHR, 62 PHR, 63 PHR, 64 PHR, 65 PHR, 66 PHR, 67 PHR, 68 PHR, 69 PHR, 70 PHR, 71 PHR, 72 PHR, 73 PHR, 74 PHR, 75 PHR, 76 PHR, 77 PHR, 78 PHR, 79 PHR, 80 PHR, 81 PHR, 82 PHR, 83 PHR, 84 PHR, 85 PHR, 86 PHR, 87 PHR, 88 PHR, 89 PHR, 90 PHR.

In various embodiments, the resin film (B) 11 has a thickness of 0.1 mm to 1.0 mm, 0.1 mm to 0.9 mm, 0.1 mm to 0.8 mm, 0.1 mm to 0.7 mm, 0.1 mm to 0.6 mm, 0.1 mm to 0.5 mm, 0.1 mm to 0.4 mm, 0.1 mm to 0.3 mm, 0.1 mm to 0.2 mm, 0.2 mm to 1.0 mm, 0.2 mm to 0.9 mm, 0.2 mm to 0.8 mm, 0.2 mm to 0.7 mm, 0.2 mm to 0.6 mm, 0.2 mm to 0.5 mm, 0.2 mm to 0.4 mm, 0.2 mm to 0.3 mm, 0.3 mm to 1.0 mm, 0.3 mm to 0.9 mm, 0.3 mm to 0.8 mm, 0.3 mm to 0.7 mm, 0.3 mm to 0.6 mm, 0.3 mm to 0.5 mm, 0.3 mm to 0.4 mm, 0.4 mm to 1.0 mm, 0.4 mm to 0.9 mm, 0.4 mm to 0.8 mm, 0.4 mm to 0.7 mm, 0.4 mm to 0.6 mm, 0.4 mm to 0.5 mm, 0.5 mm to 1.0 mm, 0.5 mm to 0.9 mm, 0.5 mm to 0.8 mm, 0.5 mm to 0.7 mm, 0.5 mm to 0.6 mm, 0.6 mm to 1.0 mm, 0.6 mm to 0.9 mm, 0.6 mm to 0.8 mm, 0.6 mm to 0.7 mm, 0.7 mm to 1.0 mm, 0.7 mm to 0.9 mm, 0.7 mm to 0.8 mm, 0.8 mm to 1.0 mm, 0.8 mm to 0.9 mm, or 0.9 mm to 1.0 mm. In one preferred embodiment, the resin film (B) 11 has a thickness of 0.1 mm to 0.3 mm.

Resin Film (A) 10 and Resin Film (C) 12

In various embodiments, the resin film (A) 10 comprises a polyvinyl acetal resin (a1) and at least one plasticizer (a2); and optionally further comprises at least one additive. In various embodiments, the resin film (C) 12 comprises a polyvinyl acetal resin (c1) and at least one plasticizer (c2); and optionally further comprises at least one additive.

The production of the polyvinyl acetal resin (a1) and the polyvinyl acetal resin (c1) is not limited in the present invention. In various embodiments, the polyvinyl acetal resin (a1) and the polyvinyl acetal resin (c1) are prepared by acetalization of (i.e., acetalizing) at least one polyvinyl alcohol with at least one aldehyde, wherein the polyvinyl alcohol used for the polyvinyl acetal resin (a1) is called polyvinyl alcohol (a1.1) and the aldehyde used for the polyvinyl acetal resin (a1) is called aldehyde (a1.2); the polyvinyl alcohol used for the polyvinyl acetal resin (c1) is called polyvinyl alcohol (c1.1) and the aldehyde used for the polyvinyl acetal resin (c1) is called aldehyde (c1.2). In various embodiments, the polyvinyl alcohol (a1.1) and the polyvinyl alcohol (c1.1) are the same; and the aldehyde (a1.2) and the aldehyde (c1.2) are the same (i.e., the polyvinyl acetal resin (a1) and the polyvinyl acetal resin (c1) have the same composition and/or the same properties). In various embodiments, the polyvinyl alcohol (a1.1) is different from the polyvinyl alcohol (c1.1); and the aldehyde (a1.2) is different from the aldehyde (c1.2). In various embodiments, the polyvinyl alcohol (a1.1) and the polyvinyl alcohol (c1.1) are the same; the aldehyde (a1.2) is different from the aldehyde (c1.2). In various embodiments, the aldehyde (a1.2) and the aldehyde (c1.2) are the same; and the polyvinyl alcohol (a1.1) is different from the polyvinyl alcohol (c1.1). In various embodiments, the polyvinyl acetal resin (a1) and the polyvinyl acetal resin (c1) have an acetalization degree of greater than or equal to 65 mol %, wherein the polyvinyl acetal resin (a1) and the polyvinyl acetal resin (c1) have the same acetalization degree. In various embodiments, the polyvinyl acetal resin (a1) and the polyvinyl acetal resin (c1) have acetalization degrees of greater than or equal to 65 mol %, wherein the polyvinyl acetal resin (a1) has a different acetalization degree from the polyvinyl acetal resin (c1). In various embodiments, the acetalization degree of the polyvinyl acetal resin (a1) and the polyvinyl acetal resin (c1) can independently be 65 mol % to 85 mol %, 65 mol % to 80 mol %, 65 mol % to 75 mol %, 65 mol % to 70 mol %, 65.1 mol % to 85 mol %, 65.1 mol % to 80 mol %, 65.1 mol % to 75 mol %, 65.1 mol % to 70 mol %, 66 mol % to 85 mol %, 66 mol % to 80 mol %, 66 mol % to 75 mol %, 66 mol % to 70 mol %, 68 mol % to 85 mol %, 68 mol % to 80 mol %, 68 mol % to 75 mol %, 68 mol % to 70 mol %, 70 mol % to 85 mol %, 70 mol % to 80 mol %, 70 mol % to 75 mol %, 71 mol % to 85 mol %, 71 mol % to 80 mol %, 71 mol % to 75 mol %, 75 mol % to 85 mol %, 75 mol % to 80 mol %, or 80 mol % to 85 mol %. In one preferred embodiment, the polyvinyl acetal resin (a1) and the polyvinyl acetal resin (c1) independently have an acetalization degree(s) of 65 mol % to 75 mol %, for example, 65 mol %, 65.5 mol %, 66 mol %, 66.5 mol %, 67 mol %, 67.5 mol %, 68 mol %, 68.5 mol %, 69 mol %, 69.5 mol %, 70 mol %, 70.5 mol %, 71 mol %, 71.5 mol %, 72 mol %, 72.5 mol %, 73 mol %, 73.5 mol %, 74 mol %, 74.5 mol %, or 75 mol %.

The number of carbon atoms of the acetal group contained in the polyvinyl acetal resin (a1) and the polyvinyl acetal resin (c1) is not particularly limited. In some embodiments, the number of carbon atoms of the acetal group in the polyvinyl acetal resin (a1) and the polyvinyl acetal resin (c1) independently may be from 1 to 12. That is the aldehyde (a1.2) used to produce the polyvinyl acetal resin (a1) and the aldehyde (c1.2) used to produce the polyvinyl acetal resin (c1) are independently aldehydes that have 1 to 12 carbons. The suitable aldehydes for the polyvinyl acetal resin (a1) and the polyvinyl acetal resin (c1) are not particularly limited, in general, an aldehyde with 1-12 carbon atoms is suitable. In some embodiments, the aldehyde (a1.2) and the aldehyde (c1.2) are independently selected from the group consisting of a $C_1$-$C_{12}$ aldehyde, a linear or straight chain aldehyde, a cyclic aldehyde, an aromatic aldehyde, an acyclic aldehyde, a branched aldehyde, a dialdehyde, a multialdehyde, a functionalized aldehyde, a substituted aldehyde, and combinations thereof. Non-limiting examples of aldehydes suitable for use as aldehyde (a1.2) and aldehyde (c1.2) include formaldehyde (including paraformaldehyde), acetaldehyde (including paracetaldehyde), propionaldehyde, n-butyraldehyde, isobutyraldehyde, n-valeraldehyde, 2-ethylbutyraldehyde, n-hexylaldehyde, n-heptylaldehyde, n-octylaldehyde, n-nonylaldehyde, n-decylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, 2-ethylhexylaldehyde, 2-ethylbutylaldehyde, cinnamaldehyde, n-undecylaldehyde, n-dodecylaldehyde, and the like.

In some embodiments, the polyvinyl acetal resin (a1) is a polyvinyl butyral resin. In some embodiments, the polyvinyl acetal resin (c1) is a polyvinyl butyral resin. In some embodiments, the polyvinyl butyral resin is prepared by reaction (acetalization) of polyvinyl alcohol with n-butyraldehyde. Methods to prepare polyvinyl acetal resins are known in the art. Methods to prepare polyvinyl butyral resins are known in the art.

Except for the acetalization degree, the polyvinyl acetal resin (a1) and the polyvinyl acetal resin (c1) also independently have hydroxyl group content ratios and acetylation degrees to present their characteristics. In various embodiments, the polyvinyl acetal resin (a1) and the polyvinyl acetal resin (c1) each independently have a hydroxyl group content ratio of less than or equal to 30 mol %, wherein the polyvinyl acetal resin (a1) and the polyvinyl acetal resin (c1) have the same hydroxyl group content ratio. In various embodiments, the polyvinyl acetal resin (a1) and the polyvinyl acetal resin (c1) each independently have hydroxyl group content ratios of less than or equal to 30 mol %, wherein the polyvinyl acetal resin (a1) has a hydroxyl group content ratio which is different from that of the polyvinyl acetal resin (c1). In various embodiments, the hydroxyl group content ratio of the polyvinyl acetal resin (a1) and the polyvinyl acetal resin (c1) can independently be 30 mol % to 5 mol %, 30 mol % to 10 mol %, 30 mol % to 15 mol %, 30 mol % to 20 mol %, 30 mol % to 25 mol %, 29.9 mol % to 5 mol %, 29.9 mol % to 10 mol %, 29.9 mol % to 15 mol %, 29.9 mol % to 20 mol %, 29.9 mol % to 25 mol %, 29 mol % to 5 mol %, 29 mol % to 10 mol %, 29 mol % to 15 mol %, 29 mol % to 20 mol %, 29 mol % to 25 mol %, 5 mol % to 10 mol %, 5 mol % to 15 mol %, 5 mol % to 20 mol %, 5 mol % to 25 mol %, 10 mol % to 15 mol %, 10 mol % to 20 mol %, 10 mol % to 25 mol %, 15 mol % to 20 mol %, 15 mol % to 25 mol %, or 20 mol % to 25 mol %. In one preferred embodiment, the polyvinyl acetal resin (a1) and the polyvinyl acetal resin (c1) each independently have a hydroxyl group content ratio of 30 mol % to 20 mol %, for example, 30 mol %, 29.5 mol %, 29 mol %, 28.5 mol %, 28 mol %, 27.5 mol %, 27 mol %, 26.5 mol %, 26 mol %, 25.5 mol %, 25 mol %, 24.5 mol %, 24 mol %, 23.5 mol %, 23 mol %, 22.5 mol %, 22 mol %, 21.5 mol %, 21 mol %, 20.5 mol %, or 20 mol %.

In various embodiments, the polyvinyl acetal resin (a1) and the polyvinyl acetal resin (c1) have an acetylation degree of less than or equal to 5 mol %, wherein the polyvinyl acetal resin (a1) and the polyvinyl acetal resin (c1) have the same acetylation degree. In various embodiments, the polyvinyl acetal resin (a1) and the polyvinyl acetal resin (c1) each independently have acetylation degrees of less than or equal to 5 mol %, wherein the polyvinyl acetal resin (a1) has an acetylation degree which is different from that of the polyvinyl acetal resin (c1). In various embodiments, the polyvinyl acetal resin (a1) and the polyvinyl acetal resin (c1) each independently have an acetylation degree(s) of 5 mol % to 0.1 mol %, 4.9 mol % to 0.1 mol %, 4.5 mol % to 0.1 mol %, 4 mol % to 0.1 mol %, 3.5 mol % to 0.1 mol %, 3 mol % to 0.1 mol %, 2.5 mol % to 0.1 mol %, 2 mol % to 0.1 mol %, 1.5 mol % to 0.1 mol %, 1 mol % to 0.1 mol %, 0.9 mol % to 0.1 mol %, 0.8 mol % to 0.1 mol %, 0.7 mol % to 0.1 mol %, 0.6 mol % to 0.1 mol %, 0.5 mol % to 0.1 mol %, 0.4 mol % to 0.1 mol %, 0.3 mol % to 0.1 mol %, 0.2 mol % to 0.1 mol %, 0.3 mol % to 1 mol %, 0.4 mol % to 1 mol %, 0.5 mol % to 1 mol %, 0.6 mol % to 1 mol %, 0.7 mol % to 1.5 mol %, 0.8 mol % to 1.5 mol %, 0.9 mol % to 1.5 mol %, 1 mol % to 1.5 mol %, 1 mol % to 2 mol %, 1 mol % to 2.5 mol %, 1 mol % to 3 mol %, 1 mol % to 3.5 mol %, 1 mol % to 4 mol %, 1 mol % to 4.5 mol %, 1 mol % to 4.9 mol %, 1 mol % to 5 mol %, 2 mol % to 2.5 mol %, 2 mol % to 3 mol %, 2 mol % to 3.5 mol %, 2 mol % to 4 mol %, 2 mol % to 4.5 mol %, 2 mol % to 4.9 mol %, 2 mol % to 5 mol %, 3 mol % to 3.5 mol %, 3 mol % to 4 mol %, 3 mol % to 4.5 mol %, 3 mol % to 4.9 mol %, 3 mol % to 5 mol %, 4 mol % to 4.5 mol %, 4 mol % to 4.9 mol %, 4 mol % to 5 mol %, or 4.5 mol % to 5 mol %. In one preferred embodiment, the polyvinyl acetal resin (a1) and the polyvinyl acetal resin (c1) each independently has an acetylation degree of 1 mol % to 0.1 mol %, for example, 1 mol %, 0.95 mol %, 0.9 mol %, 0.85 mol %, 0.8 mol %, 0.75 mol %, 0.7 mol %, 0.65 mol %, 0.6 mol %, 0.55 mol %, 0.5 mol %, 0.45 mol %, 0.4 mol %, 0.35 mol %, 0.3 mol %, 0.25 mol %, 0.2 mol %, 0.15 mol %, or 0.1 mol %. In a more preferred embodiment, the polyvinyl acetal resin (a1) has an acetylation degree of less than 5 mol %; and a hydroxyl group content ratio of less than 30 mol %. In a more preferred embodiment, the polyvinyl acetal resin (c1) has an acetylation degree of less than 5 mol %; and a hydroxyl group content ratio of less than 30 mol %.

In various embodiments, the plasticizer (a2) and the plasticizer (c2) are the same. In various embodiments, the plasticizer (a2) is different from the plasticizer (c2). In various embodiments, non-limiting examples of plasticizers suitable for use as the plasticizers (a2) and (c2) include organic ester plasticizers such as monobasic organic acid esters and polybasic organic acid esters, and phosphate plasticizers such as organic phosphate plasticizers and organic phosphite plasticizers. The monobasic organic acid esters are not particularly limited. Non-limiting examples of monobasic organic acid esters include the glycol esters obtained by the reaction of glycol, e.g., triethylene glycol, tetraethylene glycol, tripropylene glycol, etc. with a monobasic organic acid such as butyric acid, isobutyric acid, caproic acid, 2-ethylbutyric acid, heptylic acid, n-octylic acid, 2-ethylhexylic acid, pelargonic acid (n-nonylic acid), decylic acid, etc. The polybasic organic acid ester is not particularly limited. Non-limiting examples of polybasic organic acid esters include ester compounds obtained by the reaction of a polybasic organic acid, e.g., adipic acid, sebacic acid, azelaic acid, phthalic acid, isophthalic acid, terephthalic acid, etc. with an alcohol having a $C_4$-$C_8$ straight chain or branched structure. The organic ester plasticizers are not particularly limited. Non-limiting examples of organic ester plasticizers suitable for use as plasticizer (a2) and plasticizer (c2) include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-propylene glycol di-2-ethylbutyrate, 1,4-butylene glycol di-2-ethylbutyrate, 1,2-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, tetraethylene glycol di-n-heptanoate, triethylene glycol diheptanoate, tetraethylene glycol diheptanoate, dihexyl adipate, dioctyl adipate, hexyl cyclohexyl adipate, diisononyl adipate, diisodecyl adipate, heptyl nonyl adipate, dibutyl sebacate, dibutyl phthalate, etc. The organic phosphate esters are not particularly limited. Non-limiting examples of organic phosphate esters suitable for use as plasticizer (a2) and plasticizer (c2) include tributoxyethyl phosphate, isodecyl phenyl phosphate, triisopropyl phosphate, etc. Other non-limiting examples of plasticizers suitable for use as the plasticizer (a2) and/or the plasticizer (c2) include epoxy, epoxies, or various epoxy resins.

In various embodiments, plasticizer (a2) and/or plasticizer (c2) are independently selected from the group consisting of diethylene glycol dibenzoate, dipropylene glycol dibenzoate, DHA, 3GO, 4GO, 3GH, 4GH, 4G7, and 3G7, glycerol, ethylene glycol, Texanol, dipentaerythritol hexaoctoate, D600, and combinations thereof. In some embodiments, the plasticizer (a2) and/or the plasticizer (c2) independently comprise DBP. In one preferred embodiment, the plasticizer (a2) and/or the plasticizer (c2) independently comprise 3G0.

In various embodiments, the amount of plasticizer (a2) in the resin film (A) 10 is independent of the amount of plasticizer (c2) in the resin film (C) 12. In various embodiments, the amount of plasticizer (a2) in the resin film (A) 10 is the same as of the amount of plasticizer (c2) in the resin film (C) 12. In various embodiments, the amount of plasticizer (a2) in the resin film (A) 10 is different than the amount of plasticizer (c2) in the resin film (C) 12. An amount of the plasticizer (a2) in the resin film (A) 10 is expressed as the amount of the plasticizer (a2) in PHR, wherein PHR is the weight parts of the plasticizer (a2) per 100 weight parts of the polyvinyl acetal resin (a1); and the amount of the plasticizer (c2) in the resin film (C) 12 is expressed as the amount of the plasticizer (c2) in PHR, wherein PHR is the weight parts of the plasticizer (c2) per 100 weight parts of the polyvinyl acetal resin (c1). In various embodiments, the amount of the plasticizer (a2) in the resin film (A) 10 is from 0.1 PHR to 80 PHR of the plasticizer (a2); and/or the amount of the plasticizer (c2) in the resin film (C) 12 is from 0.1 PHR to 80 PHR of the plasticizer (c2); for example, from 0.1 PHR to 80 PHR, 1 PHR to 80 PHR, 5 PHR to 80 PHR, 10 PHR to 80 PHR, 20 PHR to 80 PHR, 30 PHR to 80 PHR, 40 PHR to 80 PHR, 50 PHR to 80 PHR, 60 PHR to 80 PHR, 70 PHR to 80 PHR, 0.1 PHR to 10 PHR, 10 PHR to 70 PHR, 20 PHR to 70 PHR, 30 PHR to 70 PHR, 40 PHR to 70 PHR, 50 PHR to 70 PHR, 60 PHR to 70 PHR, 10 PHR to 60 PHR, 20 PHR to 60 PHR, 30 PHR to 60 PHR, 40 PHR to 60 PHR, 50 PHR to 60 PHR, 10 PHR to 50 PHR, 20 PHR to 50 PHR, 30 PHR to 50 PHR, 40 PHR to 50 PHR, 10 PHR to 40 PHR, 20 PHR to 40 PHR, 30 PHR to 40 PHR, 0.1 PHR to 30 PHR, 1 PHR to 30 PHR, 5 PHR to 30 PHR, 10 PHR to 30 PHR, 20 PHR to 30 PHR, 0.1 PHR to 20 PHR, 1 PHR to 20 PHR, 5 PHR to 20 PHR, or 10 PHR to 20 PHR. In one preferred embodiment, the amount of the plasticizer (a2) in resin film (A) 10 is from 20 PHR to 50 PHR of the plasticizer (a2); and/or the amount of the plasticizer (c2) in resin film (C) 12 is from 20 PHR to 50 PHR of plasticizer (c2); for example, 20 PHR, 21 PHR, 22 PHR, 23 PHR, 24 PHR, 25 PHR, 26 PHR, 27 PHR, 28 PHR, 29 PHR, 30 PHR, 31 PHR, 32 PHR, 33 PHR, 34 PHR, 35 PHR, 36 PHR, 37 PHR, 38 PHR, 39 PHR, 40 PHR, 41 PHR, 42 PHR, 43 PHR, 44 PHR, 45 PHR, 46 PHR, 47 PHR, 48 PHR, 49 PHR, or 50 PHR.

In various embodiments, the resin film (A) 10 and the resin film (C) 12 have the same thickness. In various embodiments, the resin film (A) 10 has a different thickness from the resin film (C) 12. Non-limiting examples of a thickness suitable for the resin film (A) 10 and (C) include a thickness of 0.1 mm to 1.0 mm, such as 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1.0 mm. In one preferred embodiment, the resin film (A) 10 and the resin film (C) 12 each independently have thicknesses of 0.2 mm to 0.4 mm.

In various embodiments, the resin film (A) 10, the resin film (B) 11 and/or the resin film (C) 12 optionally further independently comprise at least one additive. Non-limiting examples of additives suitable for use in resin film (A) 10, the resin film (B) 11 and/or the resin film (C) 12 include stabilizers, dispersion assistants, antioxidants, photostabilizers, UV absorbers, flame retardants, static inhibitors, adhesion regulators, moisture resistance agents, heat reflecting agents, heat absorbing agents, fluorescent bleaching agents, blue pigments, electrochromic substances, photochromic substances, thermochromic substances, etc. Non-limiting examples of additives suitable for use in the resin film (A) 10, the resin film (B) 11 and/or the resin film (C) 12 include metal salts of carboxylic acids including potassium, sodium, or like alkali metal salts of octylic acid, hexylic acid, butyric acid, acetic acid, formic acid and the like; calcium, magnesium, or like alkaline earth metal salts of these acids; or zinc, or cobalt salts of these acids. Non-limiting examples of stabilizers include surfactants such as sodium laurylsulfate, or alkylbenzene sulfonic acids. Non-limiting examples of anti-oxidants include tert-butyl-hydroxytoluene (BHT), pentaerythritol tetrakis(3-(3,5-di-tert-butyl-4-hydroxyphenyl) propionate) (IRGANOX® 1010). Non-limiting examples of UV absorbers include benzotriazole types, hindered amine types, etc. Non-limiting examples of UV absorbers of benzotriazole type include 2-(2H-benzotriazol-2-yl)-p-cresol (Tinuvin® P), 2-(2H-benzotriazol-2-yl)-4,6-di-tert-butyl-phenol (Tinuvin® 320), 2-(5-chloro-2H-benzotriazol-2-yl)-6-(1,1-dimethylethyl)-4-methyl-phenol (Tinuvin® 326), etc. Non-limiting examples of UV absorbers of hindered amine type include tetrakis(2,2,6,6-tetramethyl-4-piperidyl)butane-1,2,3,4-tetracarboxylate (LA-57).

Furthermore, except for the resin film (A) 10, the resin film (B) 11, and the resin film (C) 12, the multilayer film can further comprise at least one additional film, wherein the additional film comprises at least one plasticizer, wherein the plasticizer has an SP value which is different from those of the adjacent films.

The present invention is directed to provide an interlayer film for laminated glass, comprising the aforesaid multilayer film. In various embodiments, the multilayer film of the present invention is an interlayer film (e.g., for example an interlayer film 2 for laminated glass). In various embodiments, the multilayer film of the present invention is an interlayer film 2 for laminated glass (i.e., glass laminates). In various embodiments, the interlayer film 2 for laminated glass of the present invention may optionally contain additional layers. These additional layers can have the same or different compositions as those in resin film (A), resin film (B), and/or resin film (C). For example, a heat-shielding function can be imparted to the interlayer film 2 for laminated glass of the present invention when a layer containing heat-absorbing particles is present as an additional layer. In some embodiments an additional layer may comprise a color band. In various embodiments, the interlayer film 2 for laminated glass of the present invention has a thickness of 0.30 mm to 1.60 mm, for example, 0.30 mm, 0.35 mm, 0.40 mm, 0.45 mm, 0.50 mm, 0.55 mm, 0.60 mm, 0.65 mm, 0.70 mm, 0.75 mm, 0.80 mm, 0.85 mm, 0.90 mm, 0.95 mm, 1.00 mm, 1.05 mm, 1.10 mm, 1.15 mm, 1.20 mm, 1.25 mm, 1.30 mm, 1.35 mm, 1.40 mm, 1.45 mm, 1.50 mm, 1.55 mm, or 1.60 mm. In one preferred embodiment, the interlayer film 2 for laminated glass of the present invention has a thickness of 0.70 mm to 0.90 mm or 0.70 mm to 0.80 mm.

The present invention is directed to provide a laminated glass in which the interlayer film 2 of the present invention is interposed between two transparent sheets. In some embodiments, the laminated glass of the present invention may also be used as part of double glass. In various embodiments, the transparent sheets for use in the laminated glass of the present invention are not particularly limited (e.g., any transparent sheet in ordinary use can be used in the laminated glass of the present invention). Non-limiting examples of transparent sheets include inorganic glasses such as flat glass, float glass, polished plate glass, molded plate glass, meshed plate glass, wired plate glass, colored plate glass, heat absorbent glass, heat reflecting glass, green glass, and the like. Additional non-limiting examples of transparent sheets include organic plastics of, e.g., polycarbonate, polyacrylate, and the like. In various embodiments, the present invention provides where two or more kinds of transparent sheets can be used in a laminated glass of the present invention. A non-limiting example of such an embodiment is laminated glass obtained by interposing an interlayer film 2 for laminated glass according to the present invention between flat glass and a colored plate glass. A non-limiting example of such an embodiment is laminated glass obtained by interposing an interlayer film 2 for laminated glass according to the present invention between float glass and a colored plate glass. Another non-limiting example of such an embodiment is laminated glass obtained by interposing an interlayer film 2 for laminated glass according to the present invention between an inorganic glass as described above and an organic plastic as described above. In various embodiments, when used as automotive glass, the laminated glass of the present invention can be used as windshield glass, side window glass, rear window glass, roof glass, and/or panoramic roof glass.

In various embodiments, a laminated glass comprising a multilayer film of the present invention has a loss factor of greater than or equal to 0.250. In various embodiments, the laminated glass comprising a multilayer film of the present invention has a loss factor of greater than or equal to 0.300. In some embodiments, the laminated glass comprising a multilayer film of the present invention has a loss factor of 0.250 to 0.500.

The present invention is directed to provide a sound-insulating glass laminate, comprising an interlayer film 2 wherein the interlayer film 2 is interposed between two transparent sheets. In various embodiments, the laminated glass comprising a multilayer film of the present invention is a sound-insulating glass laminate. In various embodiments, provided is a laminated glass comprising a multilayer film of the present invention, wherein the laminated glass has little or no plasticizer bleed-out. In various embodiments, provided is a laminated glass comprising a multilayer film of the present invention, wherein the laminated glass (a) has little or no plasticizer bleed-out; and (b) has a loss factor of greater than or equal to 0.250. In various embodiments, provided is a laminated glass comprising a multilayer film of the present invention, wherein the laminated glass (a) has little or no plasticizer bleed-out; and (b) has a loss factor of greater than or equal to 0.300. In various embodiments, provided is a laminated glass comprising a multilayer film of the present invention, wherein the laminated glass (a) has little or no plasticizer bleed-out; and (b) has a loss factor of 0.250 to 0.500.

There are no particular limitations on the method of producing laminated glass according to various embodiments of the present invention, and the heretofore any known methods of production can be used to produce laminated glass according to various embodiments of the present invention.

There are no limitations on the geometry and/or shape of the laminated glass and/or the interlayer film 2 as described herein. For example, in various embodiments the present invention provides a laminated glass, as shown in FIG. 1, where an interlayer film 2 (e.g., a multilayer film) is interposed between two transparent sheets (e.g., two glass sheets 1 and 3). As such the shape/geometry of the laminated glass and/or the shape/geometry of the glass sheets and/or the shape/geometry of the interlayer film is not limited to being planar (e.g., flat), as the laminated glass and/or the glass sheets and/or the interlayer film may have any geometry and/or shape (e.g., flat, planar, curved, circular, elliptical, spherical, triangular, rectangular, dome shaped, pyramid shaped, etc.).

Some embodiments of the present invention can be defined as any of the following numbered paragraphs:

1. A multilayer film, comprising:
a resin film (A) comprising a polyvinyl acetal resin (a1) and a plasticizer (a2);
a resin film (B) comprising a polyvinyl acetal resin (b1) and a plasticizer (b2); and
a resin film (C) comprising a polyvinyl acetal resin (c1) and a plasticizer (c2), wherein the resin film (B) is positioned between the resin film (A) and the resin film (C);
wherein the polyvinyl acetal resin (a1), the polyvinyl acetal resin (b1), and the polyvinyl acetal resin (c1) each independently have a hydroxyl group content ratio; and the hydroxyl group content ratio of the polyvinyl acetal resin (b1) is greater than each of the hydroxyl group content ratio of the polyvinyl acetal resin (a1) and the polyvinyl acetal resin (c1); and the polyvinyl acetal resin (b1) has a degree of acetalization of less than 60 mol %.

2. The multilayer film of paragraph 1, wherein the polyvinyl acetal resin (a1) and the polyvinyl acetal resin (c1) each independently have a degree of acetalization; and the degree of acetalization of the polyvinyl acetal resin (b1) is less than the degree of acetalization of the polyvinyl acetal resin (a1) and the polyvinyl acetal resin (c1).

3. The multilayer film of paragraph 1, wherein the polyvinyl acetal resin (a1), the polyvinyl acetal resin (b1), and the polyvinyl acetal resin (c1) each independently have a degree of acetylation; and the degree of acetylation of the polyvinyl acetal resin (b1) is greater than the degree of acetylation of the polyvinyl acetal resin (a1) and the polyvinyl acetal resin (c1).

4. The multilayer film of paragraph 1, wherein a difference between the hydroxyl group content ratio of the polyvinyl acetal resin (b1) and the hydroxyl group content ratio of the polyvinyl acetal resin (a1) is greater than 5; and a difference between the hydroxyl group content ratio of the polyvinyl acetal resin (b1) and the hydroxyl group content ratio of the polyvinyl acetal resin (c1) is greater than 5.

5. The multilayer film of paragraph 2, wherein a difference between the degree of acetalization of the polyvinyl acetal resin (b1) and the degree of acetalization of the polyvinyl acetal resin (a1) is greater than 5; and a difference between the degree of acetalization of the polyvinyl acetal resin (b1) and the degree of acetalization of the polyvinyl acetal resin (c1) is greater than 5.

6. The multilayer film of paragraph 1, wherein the plasticizer (b2) is different from the plasticizer (a2) and the plasticizer (c2).

7. The multilayer film of paragraph 1, wherein the plasticizer (b2) has a solubility parameter (calculated from Fedors' equation) of greater than or equal to 9.06.

8. The multilayer film of paragraph 7, wherein the plasticizer (a2) and the plasticizer (c2) each independently have a solubility parameter; and the solubility parameter of the plasticizer (b2) is greater than the solubility parameter of the plasticizer (a2) and the plasticizer (c2).

9. The multilayer film of paragraph 2, wherein the degree of acetalization of the polyvinyl acetal resin (a1) is greater than 65 mol %.

10. The multilayer film of paragraph 2, wherein the degree of acetalization of the polyvinyl acetal resin (c1) is greater than 65 mol %.

11. The multilayer film of paragraph 3, wherein the degree of acetylation of the polyvinyl acetal resin (b1) is greater than 5 mol %; and the hydroxyl group content ratio of the polyvinyl acetal resin (b1) is greater than 35 mol %.

12. The multilayer film of paragraph 3, wherein the acetylation degree of the polyvinyl acetal resin (a1) is less than 5 mol %; and the hydroxyl group content ratio of the polyvinyl acetal resin (a1) is less than 30 mol %.

13. The multilayer film of paragraph 3, wherein the acetylation degree of the polyvinyl acetal resin (c1) is less than 5 mol %; and the hydroxyl group content ratio of the polyvinyl acetal resin (c1) is less than 30 mol %.

14. The multilayer film of paragraph 1, wherein the plasticizer (b2) is selected from the group consisting of dihexyl adipate (DHA), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), triethylene glycol di-n-heptanoate (3G7), glycerol, ethylene glycol, 2,2,4-trimethyl-1,3-pentanediol monoisobutyrate (Texanol), dipentaerythritol hexaoctoate, and bis[2-(2-butoxyethoxy)ethyl] adipate (D600), diethylene glycol dibenzonate, dipropylene glycol dibenzonate, and combinations thereof.

15. The multilayer film of paragraph 1, wherein the amount of the plasticizer (b2) is from 50 PHR to 90 PHR, wherein PHR is the weight parts of the plasticizer (b2) per 100 weight parts of the polyvinyl acetal resin (b1).

16. An interlayer film for laminated glass, comprising the multilayer film of paragraph 1.

17. A laminated glass, comprising the interlayer film of paragraph 16, wherein the interlayer film is interposed between two transparent sheets of glass.

18. The laminated glass of paragraph 17, wherein the laminated glass has a loss factor of greater than or equal to 0.250 as measured according to ISO 16940-2008.

19. The laminated glass of paragraph 17, wherein the laminated glass has little or no plasticizer bleed-out.

20. The laminated glass of paragraph 18, wherein the laminated glass has little or no plasticizer bleed-out.

21. A sound-insulating glass laminate, comprising the interlayer film of paragraph 16, wherein the interlayer film is interposed between two transparent sheets of glass.

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

Preparation of Resin Films

General preparation of polyvinyl acetal used in the present invention is described as follows.

The polyvinyl acetal resin (a1), the polyvinyl acetal resin (b1), and the polyvinyl acetal resin (c1) used here for the Examples and Comparative Examples in Table 2 were polyvinyl butyral resins, which were obtained by acetalization of polyvinyl alcohols with n-butyraldehydes. The polyvinyl acetal resin (a1), the polyvinyl acetal resin (b1), and the polyvinyl acetal resin (c1) had degrees of acetalization, acetylation degrees, and hydroxyl group content ratios as shown in Table 2. PVA, 3GO, D600, D827 were purchased from Chang Chun Petrochemical; 4G7 was purchased from BOC Sciences; and Texanol was purchased from JNC Corporation.

The resin films and the interlayer film were produced by the following method. A specified parts by weight amount of plasticizer (a2), plasticizer (b2), and plasticizer (c2) were mixed with 100 parts by weight of polyvinyl acetal resin (a1), polyvinyl acetal resin (b1), and polyvinyl acetal resin (c1), respectively, as shown in Table 2. The mixture was kneaded at 35 rpm with a mixing machine (Brabender®, Germany, Mixer 50 EHT) at 120° C. for 15 minutes and cooled to ambient temperature to provide plastic blocks. The plastic blocks were pressed with a hot-press machine (GO-TECH, Taiwan, GT-7014-A) at 150° C. for 3 minutes to provide a resin film. The resin film (A) provided a film having a 0.35 mm thickness. The resin film (B) provided a film having a 0.10 mm thickness. The resin film (C) provided a film having a 0.35 mm thickness.

Fabrication of Laminated Glass

The interlayer film was interposed between a pair of transparent float glass. In details, a laminated glass sample was prepared by laying-up the obtained resin films (i.e., resin films A, B, and C) with sheets of glass in the order: Glass Sheet/Resin Film (A)/Resin Film (B)/Resin Film (C)/Glass Sheet as shown in Table 2. A hot-presser (GO-TECH, Taiwan, GT-7014-A) was used to prepress the laminated glass sample at 150° C. for 3 minutes. Following the prepress procedure, the laminated glass sample was autoclaved at 13 bar and 135° C. for 120 minutes and subsequently cooled to ambient temperature to complete the lamination process. The glass sheet used in all of the Examples 1-8 and Comparative Examples 9-16 in Table 2 was flat glass.

The laminated glass samples obtained in Examples 1 to 8 and Comparative Examples 9 to 16 were evaluated for their loss factors and the bleed-out situations of the plasticizers. Examples 1-8 are embodiments of the present invention. Comparative Examples 9-16 are not embodiments of the present invention. The results are provided in Table 2.

TABLE 2

| | Item | | Example 1 | Example 2 | Example 3 | Example 4 |
|---|---|---|---|---|---|---|
| Resin Film (A) | Polyvinyl Acetal Resin (a1) | Acetalization Degree (mol %) | 71.40 | 71.26 | 71.26 | 71.26 |

TABLE 2-continued

|  |  |  |  |  |  |  |
|---|---|---|---|---|---|---|
|  |  | Acetylation Degree (mol %) | 0.44 | 0.48 | 0.48 | 0.48 |
|  |  | Hydroxyl Group Content Ratio (mol %) | 28.15 | 28.26 | 28.26 | 28.26 |
|  | Plasticizer (a2) type |  | 3GO | 3GO | 3GO | 3GO |
|  | Plasticizer (a2) content (PHR) |  | 38.5 | 38.5 | 38.5 | 38.5 |
| Resin Film (B) | Polyvinyl Acetal Resin (b1) | Acetalization Degree (mol %) | 55.14 | 46.5 | 43.40 | 43.40 |
|  |  | Acetylation Degree (mol %) | 6.82 | 6.00 | 10.30 | 10.30 |
|  |  | Hydroxyl Group Content Ratio (mol %) | 38.03 | 47.6 | 46.30 | 46.30 |
|  | Plasticizer (b2) type |  | D600 | D600 | D600 | D600 |
|  | Plasticizer (b2) content (PHR) |  | 50.0 | 60.0 | 60.00 | 80.0 |
| Resin Film (C) | Polyvinyl Acetal Resin (c1) | Acetalization Degree (mol %) | 71.40 | 71.26 | 71.26 | 71.26 |
|  |  | Acetylation Degree (mol %) | 0.44 | 0.48 | 0.48 | 0.48 |
|  |  | Hydroxyl Group Content Ratio (mol %) | 28.15 | 28.26 | 28.26 | 28.26 |
|  | Plasticizer (c2) type |  | 3GO | 3GO | 3GO | 3GO |
|  | Plasticizer (c2) content (PHR) |  | 38.5 | 38.5 | 38.5 | 38.5 |
|  |  | Test result |  |  |  |  |
|  | Loss factor (Spec ≥ 0.25) |  | 0.278 | 0.313 | 0.287 | 0.324 |
|  | Plasticizer bleed-out |  | No | No | No | No |

PHR is parts per hundred of Resin.

| Item |  |  | Example 5 | Example 6 | Example 7 | Example 8 |
|---|---|---|---|---|---|---|
| Resin Film (A) | Polyvinyl Acetal Resin (a1) | Acetalization Degree (mol %) | 71.26 | 71.26 | 71.26 | 71.26 |
|  |  | Acetylation Degree (mol %) | 0.48 | 0.48 | 0.48 | 0.48 |
|  |  | Hydroxyl Group Content Ratio (mol %) | 28.26 | 28.26 | 28.26 | 28.26 |
|  | Plasticizer (a2) type |  | 3GO | 3GO | 3GO | 3GO |
|  | Plasticizer (a2) content (PHR) |  | 38.5 PHR | 38.5 PHR | 38.5 PHR | 38.5 PHR |
| Resin Film (B) | Polyvinyl Acetal Resin (b1) | Acetalization Degree (mol %) | 43.40 | 43.40 | 43.40 | 30.50 |
|  |  | Acetylation Degree (mol %) | 10.30 | 10.30 | 10.30 | 22.90 |
|  |  | Hydroxyl Group Content Ratio (mol %) | 46.30 | 46.30 | 46.30 | 46.60 |
|  | Plasticizer (b2) type |  | 4G7 | Texanol | D827 | D600 |
|  | Plasticizer (b2) content (PHR) |  | 80.0 PHR | 80.0 PHR | 80.0 PHR | 80.0 PHR |

TABLE 2-continued

| | | | | | | |
|---|---|---|---|---|---|---|
| Resin Film (C) | Polyvinyl Acetal Resin (c1) | Acetalization Degree (mol %) | 71.26 | 71.26 | 71.26 | 71.26 |
| | | Acetylation Degree (mol %) | 0.48 | 0.48 | 0.48 | 0.48 |
| | | Hydroxyl Group Content Ratio (mol %) | 28.26 | 28.26 | 28.26 | 28.26 |
| | Plasticizer (c2) type | | 3GO | 3GO | 3GO | 3GO |
| | Plasticizer (c2) content (PHR) | | 38.5 PHR | 38.5 PHR | 38.5 PHR | 38.5 PHR |
| | | Test result | | | | |
| Loss factor (Spec ≥ 0.25) | | | 0.283 | 0.336 | 0.338 | 0.343 |
| Plasticizer bleed-out | | | No | No | No | No |

PHR is parts per hundred of Resin.

| | | | Comparative Example 9 | Comparative Example 10 | Comparative Example 11 | Comparative Example 12 |
|---|---|---|---|---|---|---|
| Resin Film (A) | Polyvinyl Acetal Resin (a1) | Acetalization Degree (mol %) | 71.40 | 71.40 | 71.40 | 71.40 |
| | | Acetylation Degree (mol %) | 0.44 | 0.44 | 0.44 | 0.44 |
| | | Hydroxyl Group Content Ratio (mol %) | 28.15 | 28.15 | 28.15 | 28.15 |
| | Plasticizer (a2) type | | 3GO | 3GO | 3GO | 3GO |
| | Plasticizer (a2) content (PHR) | | 38.5 | 38.5 | 38.5 | 38.5 |
| Resin Film (B) | Polyvinyl Acetal Resin (b1) | Acetalization Degree (mol %) | 60.63 | 63.50 | 61.05 | 61.05 |
| | | Acetylation Degree (mol %) | 0.56 | 12.80 | 6.13 | 6.13 |
| | | Hydroxyl Group Content Ratio (mol %) | 38.80 | 23.70 | 32.82 | 32.82 |
| | Plasticizer (b2) type | | D600 | 3GO | D600 | 3GO |
| | Plasticizer (b2) content (PHR) | | 50.0 | 50.0 | 50.0 | 50.0 |
| Resin Film (C) | Polyvinyl Acetal Resin (c1) | Acetalization Degree (mol %) | 71.40 | 71.40 | 71.40 | 71.40 |
| | | Acetylation Degree (mol %) | 0.44 | 0.44 | 0.44 | 0.44 |
| | | Hydroxyl Group Content Ratio (mol %) | 28.15 | 28.15 | 28.15 | 28.15 |
| | Plasticizer (c2) type | | 3GO | 3GO | 3GO | 3GO |
| | Plasticizer (c2) content (PHR) | | 38.5 | 38.5 | 38.5 | 38.5 |
| | | Test result | | | | |
| Loss factor (Spec ≥ 0.25) | | | 0.109 | 0.306 | 0.146 | 0.108 |
| Plasticizer bleed-out | | | No | Yes | No | No |

Note:
PHR is parts per hundred of Resin.

| | | | Comparative Example 13 | Comparative Example 14 | Comparative Example 15 | Comparative Example 16 |
|---|---|---|---|---|---|---|
| Resin Film (A) | Polyvinyl Acetal Resin (a1) | Acetalization Degree (mol %) | 71.40 | 71.40 | 71.26 | 71.26 |
| | | Acetylation Degree (mol %) | 0.44 | 0.44 | 0.48 | 0.48 |

TABLE 2-continued

|  |  |  | | | | |
|---|---|---|---|---|---|---|
|  |  | Hydroxyl Group Content Ratio (mol %) | 28.15 | 28.15 | 28.26 | 28.26 |
|  |  | Plasticizer (a2) type | 3GO | 3GO | 3GO | 3GO |
|  |  | Plasticizer (a2) content (PHR) | 38.5 PHR | 38.5 PHR | 38.5 PHR | 38.5 PHR |
| Resin Film (B) | Polyvinyl Acetal Resin (b1) | Acetalization Degree (mol %) | 61.05 | 61.05 | 46.50 | 43.40 |
|  |  | Acetylation Degree (mol %) | 6.13 | 6.13 | 6.00 | 10.30 |
|  |  | Hydroxyl Group Content Ratio (mol %) | 32.82 | 32.82 | 47.60 | 46.30 |
|  |  | Plasticizer (b2) type | D600 | 3GO | 3GO | 3GO |
|  |  | Plasticizer (b2) content (PHR) | 60.0 PHR | 60.0 PHR | 60.0 PHR | 80.0 PHR |
| Resin Film (C) | Polyvinyl Acetal Resin (c1) | Acetalization Degree (mol %) | 71.40 | 71.40 | 71.26 | 71.26 |
|  |  | Acetylation Degree (mol %) | 0.44 | 0.44 | 0.48 | 0.48 |
|  |  | Hydroxyl Group Content Ratio (mol %) | 28.15 | 28.15 | 28.26 | 28.26 |
|  |  | Plasticizer (c2) type | 3GO | 3GO | 3GO | 3GO |
|  |  | Plasticizer (c2) content (PHR) | 38.5 PHR | 38.5 PHR | 38.5 PHR | 38.5 PHR |
|  |  | Test result | | | | |
|  | Loss factor (Spec ≥ 0.25) |  | 0.164 | 0.128 | 0.118 | 0.183 |
|  | Plasticizer bleed-out |  | No | No | No | No |

Note:
PHR is parts per hundred of Resin.

The results show the loss factors of Examples 1-8 are all greater than 0.25, that is, Examples 1-8 present excellent sound-insulating effect. One of the reasons for causing the results is that the hydroxyl group content in the resin films (B) of Examples 1-8 was increased so as to enhance the compatibility of the resin films (B) with the plasticizer effectively. Namely, the resin films (B) of Examples 1-8 allow to add more plasticizers to achieve the effect for enhancing sound-insulating than Comparative Examples 9-16. On the other hand, the plasticizers used in the resin films (B) of Examples 1-8 have higher SP value than the plasticizers which is commonly used in the art (i.e. 3GO), and used in the resin film (A) and the resin film (C) of all Examples 1-8 and Comparative Examples 9-16 and used in the resin films (B) of Comparative Examples 10, 12, and 14 to 16. High SP value also can enhance the compatibility of the resin film with the plasticizer effectively so that the intermediate layer (i.e., the resin film (B) allows to add more plasticizers to achieve the effect for enhancing sound-insulating.

Furthermore, the results also show that all of the laminated glasses of the Examples 1-8 had no plasticizer bleed-out situation. These are due to, in one laminated glass, the plasticizers used in the resin films (B) were different from the plasticizers used in the resin film (A) and the resin film (C) in Examples 1-8. Consequently, the plasticizer migration between different layers (or different resin films) is prevented and the laminated glass has little or no plasticizer bleed-out.

In conclusion, the present invention provides a multilayer film and an interlayer film, a laminated glass, and a sound-insulating glass laminate comprising the same that can effectively improve the compatibility of the resin film (B) with the plasticizer so that the intermediate layer (i.e., the resin film (B)) allows to add more plasticizer(s) to achieve the effect for enhancing sound-insulating. Furthermore, the intermediate layer (i.e., the resin film (B)) of the multilayer film of the present invention uses different plasticizer from the non-intermediate layer (i.e., the resin film (A) and the resin film (C)) of the multilayer film so as to prevent the migration of plasticizers between different layers and the multilayer film has little or no plasticizer bleed-out.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

What is claimed is:

1. A multilayer film, comprising:
   a resin film (A) comprising a polyvinyl acetal resin (a1) and a plasticizer (a2);
   a resin film (B) comprising a polyvinyl acetal resin (b1) and a plasticizer (b2); and
   a resin film (C) comprising a polyvinyl acetal resin (c1) and a plasticizer (c2), wherein the resin film (B) is positioned between the resin film (A) and the resin film (C);
   wherein the polyvinyl acetal resin (a1), the polyvinyl acetal resin (b1), and the polyvinyl acetal resin (c1) each independently have a hydroxyl group content ratio; and the hydroxyl group content ratio of the polyvinyl acetal resin (b1) is greater than each of the hydroxyl group content ratio of the polyvinyl acetal resin (a1) and the polyvinyl acetal resin (c1); and the polyvinyl acetal resin (b1) has a degree of acetalization of less than 60 mol %.

2. The multilayer film of claim 1, wherein the polyvinyl acetal resin (a1) and the polyvinyl acetal resin (c1) each independently have a degree of acetalization; and the degree of acetalization of the polyvinyl acetal resin (b1) is less than the degree of acetalization of the polyvinyl acetal resin (a1) and the polyvinyl acetal resin (c1).

3. The multilayer film of claim 1, wherein the polyvinyl acetal resin (a1), the polyvinyl acetal resin (b1), and the polyvinyl acetal resin (c1) each independently have a degree of acetylation; and the degree of acetylation of the polyvinyl acetal resin (b1) is greater than the degree of acetylation of the polyvinyl acetal resin (a1) and the polyvinyl acetal resin (c1).

4. The multilayer film of claim 1, wherein a difference between the hydroxyl group content ratio of the polyvinyl acetal resin (b1) and the hydroxyl group content ratio of the polyvinyl acetal resin (a1) is greater than 5; and a difference between the hydroxyl group content ratio of the polyvinyl acetal resin (b1) and the hydroxyl group content ratio of the polyvinyl acetal resin (c1) is greater than 5.

5. The multilayer film of claim 2, wherein a difference between the degree of acetalization of the polyvinyl acetal resin (b1) and the degree of acetalization of the polyvinyl acetal resin (a1) is greater than 5; and a difference between the degree of acetalization of the polyvinyl acetal resin (b1) and the degree of acetalization of the polyvinyl acetal resin (c1) is greater than 5.

6. The multilayer film of claim 1, wherein the plasticizer (b2) is different from the plasticizer (a2) and the plasticizer (c2).

7. The multilayer film of claim 1, wherein the plasticizer (b2) has a solubility parameter (calculated from Fedors' equation) of greater than or equal to 9.06.

8. The multilayer film of claim 7, wherein the plasticizer (a2) and the plasticizer (c2) each independently have a solubility parameter; and the solubility parameter of the plasticizer (b2) is greater than the solubility parameter of the plasticizer (a2) and the plasticizer (c2).

9. The multilayer film of claim 2, wherein the degree of acetalization of the polyvinyl acetal resin (a1) is greater than 65 mol %.

10. The multilayer film of claim 2, wherein the degree of acetalization of the polyvinyl acetal resin (c1) is greater than 65 mol %.

11. The multilayer film of claim 3, wherein the degree of acetylation of the polyvinyl acetal resin (b1) is greater than 5 mol %; and the hydroxyl group content ratio of the polyvinyl acetal resin (b1) is greater than 35 mol %.

12. The multilayer film of claim 3, wherein the acetylation degree of the polyvinyl acetal resin (a1) is less than 5 mol %; and the hydroxyl group content ratio of the polyvinyl acetal resin (a1) is less than 30 mol %.

13. The multilayer film of claim 3, wherein the acetylation degree of the polyvinyl acetal resin (c1) is less than 5 mol %; and the hydroxyl group content ratio of the polyvinyl acetal resin (c1) is less than 30 mol %.

14. The multilayer film of claim 1, wherein the plasticizer (b2) is selected from the group consisting of dihexyl adipate (DHA), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), triethylene glycol di-n-heptanoate (3G7), glycerol, ethylene glycol, 2,2,4-trimethyl-1,3-pentanediol monoisobutyrate (Texanol), dipentaerythritol hexaoctoate, and bis[2-(2-butoxyethoxy)ethyl] adipate (D600), diethylene glycol dibenzoate, dipropylene glycol dibenzoate, and combinations thereof.

15. The multilayer film of claim 1, wherein the amount of the plasticizer (b2) is from 50 PHR to 90 PHR, wherein PHR is the weight parts of the plasticizer (b2) per 100 weight parts of the polyvinyl acetal resin (b1).

16. An interlayer film for laminated glass, comprising the multilayer film of claim 1.

17. A laminated glass, comprising the interlayer film of claim 16, wherein the interlayer film is interposed between two transparent sheets of glass.

18. The laminated glass of claim 17, wherein the laminated glass has a loss factor of greater than or equal to 0.250 as measured according to ISO 16940-2008.

19. The laminated glass of claim 17, wherein the laminated glass has little or no plasticizer bleed-out.

20. The laminated glass of claim 18, wherein the laminated glass has little or no plasticizer bleed-out.

21. A sound-insulating glass laminate, comprising the interlayer film of claim 16, wherein the interlayer film is interposed between two transparent sheets of glass.

* * * * *